US008743416B2

(12) United States Patent
Yanagawa (10) Patent No.: US 8,743,416 B2
(45) Date of Patent: Jun. 3, 2014

(54) DATA PROCESSING PROGRAM AND DATA PROCESSOR

(75) Inventor: Ryo Yanagawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 126 days.

(21) Appl. No.: 13/269,909

(22) Filed: Oct. 10, 2011

(65) Prior Publication Data

US 2012/0127489 A1    May 24, 2012

(30) Foreign Application Priority Data

Nov. 23, 2010   (JP) ................................. 2010-260696

(51) Int. Cl.
*G06K 15/02*        (2006.01)

(52) U.S. Cl.
CPC .................. *G06K 15/1803* (2013.01)
USPC .......................................... 358/1.2; 358/1.18

(58) Field of Classification Search
CPC ............................ G06K 15/1803; G06K 15/18
See application file for complete search history.

(56) References Cited

U.S. PATENT DOCUMENTS

| 7,142,318 | B2 | 11/2006 | Lopez et al. |
| 7,746,491 | B2 | 6/2010 | Ikeda et al. |
| 2003/0020945 | A1 | 1/2003 | Lopez et al. |
| 2004/0095587 | A1* | 5/2004 | Brown et al. ................. 358/1.2 |
| 2005/0027483 | A1 | 2/2005 | Ikeda et al. |
| 2005/0213154 | A1* | 9/2005 | Narusawa et al. .......... 358/1.18 |
| 2010/0053660 | A1* | 3/2010 | Tsuboi et al. ................ 358/1.14 |

FOREIGN PATENT DOCUMENTS

| JP | 2002-132758 | | 5/2002 |
| JP | 2003-162383 | A | 6/2003 |
| JP | 2005-049950 | A | 2/2005 |
| JP | 2006-192712 | | 7/2006 |
| JP | 2006-237705 | A | 9/2006 |

* cited by examiner

*Primary Examiner* — Saeid Ebrahimi Dehkordy
*Assistant Examiner* — Lennin RodriguezGonzalez
(74) *Attorney, Agent, or Firm* — Banner & Witcoff, Ltd.

(57) ABSTRACT

A non-transitory computer readable storage medium storing a set of program instructions installed on and executed by a computer. The set of program instructions includes (a) acquiring a layout image size where the layout image is generated based on an original image data, the size of the layout image is specified by base data, and the base data represents graphical image in which the layout image is arranged and includes location data that specifies a location at which the original image data is stored, (b) acquiring an original image size, (c) determining whether the original image size is greater than the layout image size, (d) setting the original image as a print target when the original image size is greater than the layout image size, and (e) generating a print instruction instructing to print the original image set as the print target in a size larger than the layout size.

16 Claims, 4 Drawing Sheets

FIG.1

DATA PROCESSING PROGRAM AND DATA PROCESSOR

CROSS REFERENCE TO RELATED APPLICATION

This application claims priority from Japanese Patent Application No. 2010-260696 filed Nov. 23, 2010. The entire content of the priority application is incorporated herein by reference.

TECHNICAL FIELD

The invention relates to a data processor and a data processing program.

BACKGROUND

Personal computers have conventionally used various types of display data for displaying documents and Web pages, on a monitor, for example, in a form that the user can browse. Often images are laid out in the display data. Conventional technologies for printing Web pages allow the user to print just the image portions of the Web page without the background colors and text portions.

SUMMARY

In many cases, the images laid out in the display data are reduced in size to fit within defined layout areas. When documents including images are printed using the above conventional technology, the subject matter in the printed images can be difficult to discern because the images are printed at reduced sizes. However, the user most likely desires clearer printing results, particularly when printing only the image portions of the display data. Consequently, printed images that are barely legible do not meet the user's expectations.

In view of the foregoing, it is an object of the invention to provide a data processor and a data processing program capable of printing images contained in display data in a more legible form.

In order to attain the above and other objects, the invention provides a non-transitory computer readable storage medium storing a set of program instructions installed on and executed by a computer. The set of program instructions includes (a) acquiring a layout image size that is a size of a layout image where the layout image is generated based on an original image data, the size of the layout image is specified by base data, and the base data represents graphical image in which the layout image is arranged and includes location data that specifies a location at which the original image data is stored, (b) acquiring an original image size that is a size of an original image represented by the original image data, (c) determining whether the original image size is greater than the layout image size, (d) setting the original image as a print target when the original image size is greater than the layout image size, (e) generating a print instruction instructing to print the original image set as the print target in a size larger than the layout size, and (f) outputting the print instruction.

According to another aspect, the invention provides a data processor. A data processor includes a processing unit, and a non-transitory medium having instructions stored thereon that, when executed by the processing unit, cause the processing unit to function as a layout image size acquiring part, an original image size acquiring part, a determining part, a setting part, and a generating part. The layout image size acquiring part acquires a layout image size that is a size of a layout image. The layout image is generated based on an original image data. The size of the layout image is specified by base data. The base data represents graphical image in which the layout image is arranged and includes location data that specifies a location at which the original image data is stored. The original image size acquiring part acquires an original image size that is a size of an original image represented by the original image data. The determining part determines whether the original image size is greater than the layout image size. The setting part sets the original image as a print target when the original image size is greater than the layout image size. The generating part generates a print instruction instructing to print the original image set as the print target in a size larger than the layout size. The outputting part outputs the print instruction.

According to another aspect, the invention provides a method. The method includes (a) acquiring a layout image size that is a size of a layout image, where the layout image is generated based on an original image data, where the size of the layout image is specified by base data, where the base data represents graphical image in which the layout image is arranged and includes location data that specifies a location at which the original image data is stored, (b) acquiring an original image size that is a size of an original image represented by the original image data, (c) determining whether the original image size is greater than the layout image size, (d) setting the original image as a print target when the original image size is greater than the layout image size, (e) generating a print instruction instructing to print the original image set as the print target in a size larger than the layout size, and (f) outputting the print instruction.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
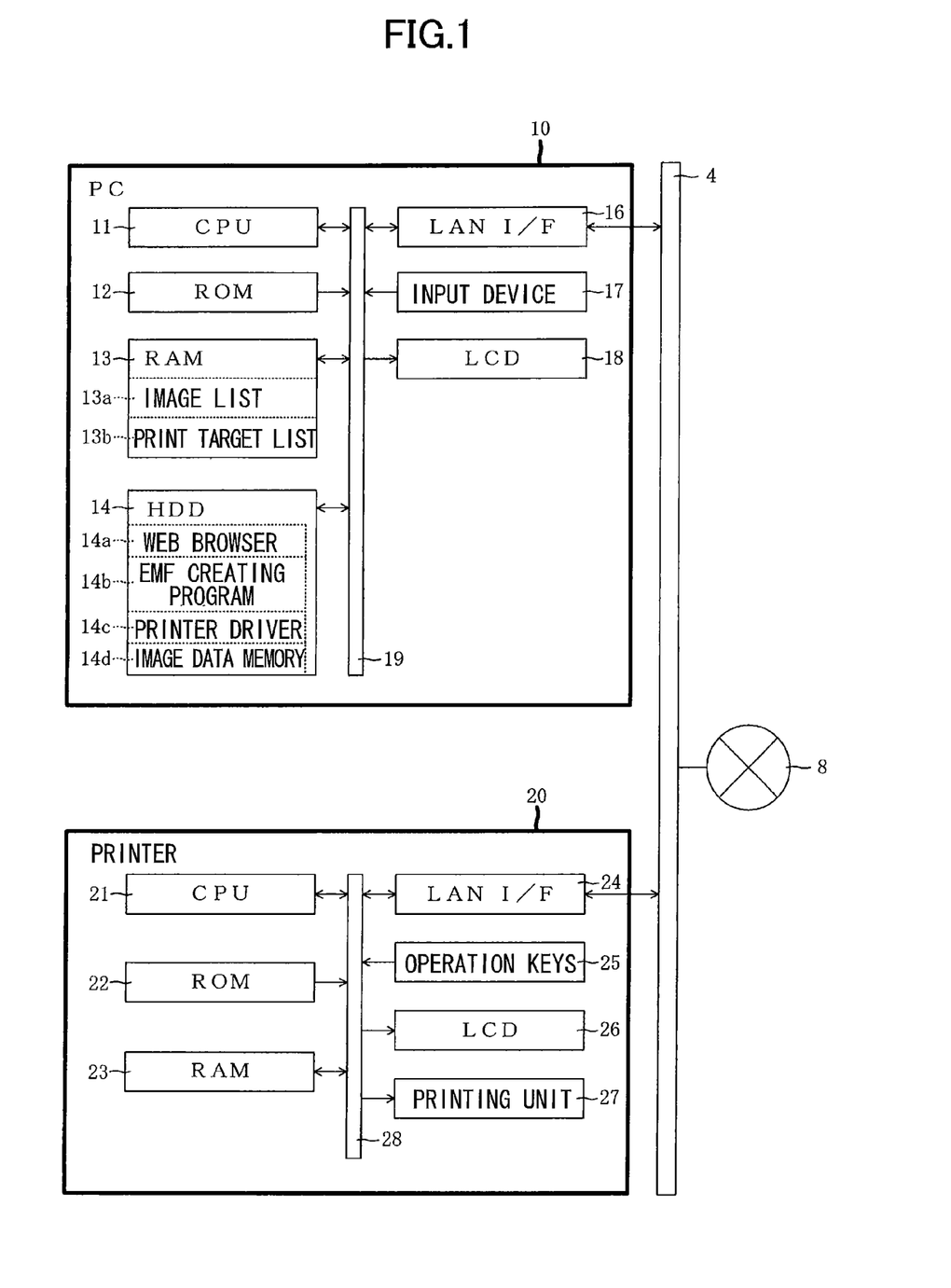
FIG. 1 is a block diagram showing the general electrical structure of a personal computer in which an EMF creating program is installed and a printer connected to the personal computer.

FIG. 1 is a block diagram showing the general electrical structure of a personal computer 10 (hereinafter "PC 10"), and a printer 20 connected to the PC 10. An Enhanced MetaFile (EMF) creating program 14*b* installed on the PC 10 is an embodiment of the data processing program according to the invention. As shown in FIG. 1, the PC 10 and the printer 20 are interconnected via a local area network (LAN) 4. The LAN 4 is further connected to Internet 8 via a router (not shown). The PC 10 is configured to control the printer 20 to print images arranged on a Web page in a more legible form. This process will be described later in greater detail.

The PC 10 primarily includes a CPU 11, a ROM 12, a RAM 13, a hard disk drive 14 (hereinafter HDD 14), a LAN interface 16, an input device 17, and a liquid crystal display (LCD) 18. The above components are interconnected via a bus line 19.

The CPU 11 controls each component connected to the bus line 19 according to fixed values and programs stored in the ROM 12 and the HDD 14. The ROM 12 is memory that serves to store programs and the like for controlling operations of the PC 10. The RAM 13 is writable memory that functions to temporarily store data and the like required for processing by the CPU 11. The RAM 13 is provided with an image list 13a, and a print target list 13b. The image list 13a is a list of file paths for image data representing images laid out on a Web page, size data specifying the sizes of images laid out on the Web page, and the like. The print target list 13b is a list of images arranged on the Web page that meet a prescribed condition and are thus recorded as print targets.

The HDD 14 is provided with a Web browser 14a, a EMF creating program 14b, a printer driver 14c, and image data memory 14d. When the Web browser 14a is executed, the PC 10 accesses a server (not shown) on the Internet 8, acquires Web page data in the HTML format, i.e., the source code for the Web page, and stores the acquired data in the RAM 13, for example. The PC 10 subsequently interprets this Web page data, creates a Web page, and displays the Web page on the LCD 18.

The EMF creating program 14b is a plug-in installed in the Web browser 14a. When the EMF creating program 14b is executed, the PC 10 creates Enhanced MetaFile (EMF) format data as an intermediate file for creating print data. The PC 10 subsequently outputs the EMF data to the printer driver 14c.

The printer driver 14c is a program used to control the printer 20. When the printer driver 14c is executed, the PC 10 creates print data from the EMF data and outputs the print data to the printer 20. The LAN interface 16 functions to connect the PC 10 to the LAN 4. The input device 17 enables the user of the PC 10 to input instructions and data into the PC 10. The LCD 18 displays various information, including Web pages.

The image data memory 14d is memory for storing original image data that the PC 10 acquires from the Internet 8. Original image data will be described later with reference to FIG. 2.

The printer 20 primarily includes a CPU 21, a ROM 22, a RAM 23, a LAN interface 24, operating keys 25, an LCD 26, and a printing unit 27. The above components are interconnected via a bus line 28.

The CPU 21 executes various processes according to programs stored in the ROM 22. The ROM 22 is memory functioning to store programs and the like used to control operations of the printer 20. The RAM 23 is memory for temporarily storing data and the like required in processing by the CPU 21.

The operating keys 25 enable a user to input instructions and data into the printer 20. The LCD 26 displays various information. The printer 20 drives the printing unit 27 based on print data inputted from the PC 10 via the LAN interface 24 to print images on paper.

Figure 2:
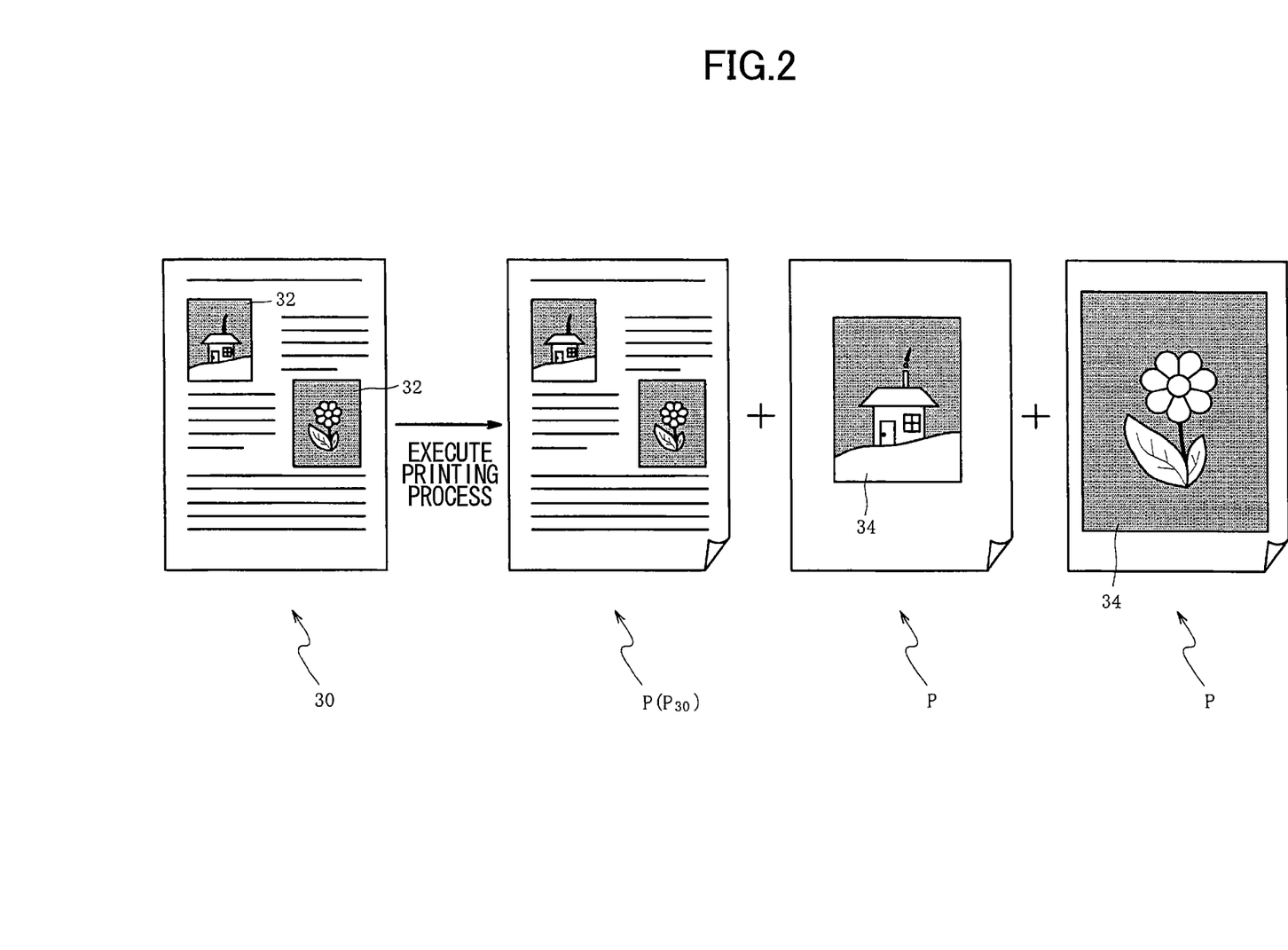
FIG. 2 is an explanatory diagram illustrating samples of printing results acquired when the personal computer executes a Web page printing process.

FIG. 2 is an explanatory diagram illustrating samples of printing results acquired when the PC 10 executes a Web page printing process described later with reference to FIG. 3. In FIG. 2, a Web page 30 denotes a Web page displayed on the LCD 18, while a Web page $P_{30}$ denotes a Web page printed on a sheet of paper P. When the PC 10 receives a print command from a user to print the Web page 30, the PC 10 controls the printer 20 to print the Web page $P_{30}$, and also controls the printer 20 to print images in the Web page 30 that meet a prescribed condition on separate sheets of paper P from the Web page $P_{30}$. This process will be described later in greater detail.

The HTML data for a Web page that the PC 10 acquires from the Internet 8 includes file paths and size data. File paths are data indicating the storage locations on the Internet 8 for image files in the JPEG or the bitmap format. An image file that can be acquired from the storage location indicated in a file path will hereinafter be referred to as original image data. The size data indicates the sizes of layout images 32 arranged in the Web page 30. The Web browser 14a analyzes Web page data, creates layout images 32 of a size specified by the size data based on the original image data specified by the file paths, and lays out the layout images 32 in the Web page 30.

In the embodiment, the "image size" is expressed by the number of pixels in the width direction by the number of pixels in the height direction. In some cases, the size of an original image represented by the original image data differs from the size of the corresponding layout image 32 laid out on the Web page 30. For example, if the size of an original image represented by the original image data is 400×300 and the size of the corresponding layout image 32 specified by the size data is 200×150, the PC 10 executes a reduction process well known in the art on the original image data in order to create the layout image 32 at the size of 200×150 by reducing the original image by 50%, and lays out the layout image 32 in the Web page 30. In this way, layout images 32 can be laid out on the Web page 30 at sizes specified by the creator of the Web page, regardless the sizes of the original images.

In order to control the printer 20 to print the Web page $P_{30}$, the EMF creating program 14b creates EMF data constituting write commands based on the Web page 30 and transfers this data to the printer driver 14c. The printer driver 14c creates print data from the EMF data and outputs the print data to the printer 20. When the layout images 32 laid out in the Web page 30 were generated by reducing the original images, it is unlikely that the corresponding images in the printed results will be clearly recognizable because the EMF data was created based on layout images 32 that lost a portion of the image data during the reduction process, i.e., layout images 32 having a smaller number of pixels than the original images.

In addition to the creation of the EMF data to print the Web page $P_{30}$, the PC 10 according to the embodiment creates EMF data using the original image data for an original image that is larger than the corresponding layout image 32. Therefore, the PC 10 can control the printer 20 to print the original image at a larger size than the corresponding layout image 32 in a form that is more legible. For example, if the original image is 400×300 in size and the layout image 32 is 200×150 in size, it is possible to obtain a 400×300 printed image simply by enlarging the Web page 30 that includes the layout image 32 by a printing magnification of 200%. However, this method simply stretches the 200×150 layout image 32 to a size of 400×300 and cannot compensate for the data lost when the original image was reduced. In contrast, the PC 10 according to the embodiment creates EMF data using the original image data that has not undergone the reduction process, thereby enabling the printer 20 to print an image at a size greater than the layout image 32 that is clearer and more legible.

In order to differentiate the original image printed on a sheet of paper P from the original image represented by original image data, a reference number will be assigned to the original image printed on the paper P in the following description. Specifically, the printed original image will be referred to as an original image 34. No reference number will be assigned to the original image represented by the original image data. The size of the original image 34 printed on a sheet of paper P is adjusted based on various print settings, such as the printing magnification. Therefore, the size of the original image 34 printed on paper P may in some cases be different from the size of the original image represented by the original image data.

For example, if the original image has the size 400×300 and the printing magnification is set to 200%, then the PC 10 can create EMF data using the original image data after enlarging the original image data by the printing magnification of 200%, thereby controlling the printer 20 to print an 800×600 original image 34. Further, one of the print settings that may be possessed by the Web browser 14a is the option "Scale to paper size." When this option is selected, the EMF creating program 14b automatically enlarges or reduces the image data to be printed based on the selected paper size and printing resolution when creating the EMF data. For example, if the selected paper size is 3R (L in Japan; 89×127 mm) and the printing resolution is set to 300 dpi, there are approximately 1051×1500 printable pixels on the 3R sheet of paper P. Therefore, if the original image represented by the original image data has a size of 200×300 and the option "Scale to paper size" has been selected, the EMF creating program 14b creates EMF data using the original image data after enlarging the data by the printing magnification of 500%, for example, thereby controlling the printer 20 to print a 1000×1500 original image 34 that matches the 3R paper.

Various print settings, such as printing magnification, paper size, and printing resolution, are similarly reflected in the results of printing the Web page $P_{30}$. Accordingly, the Web page $P_{30}$ printed by the printer 20 is not necessarily the same size as the Web page 30 displayed on the LCD 18. However, for the sake of simplification, the following description of this process will assume that the Web page $P_{30}$ printed by the printer 20 is the same size as the Web page 30 displayed on the LCD 18 and that the original images 34 printed by the printer 20 are the same size as the corresponding original images represented by the original image data.

Figure 3:
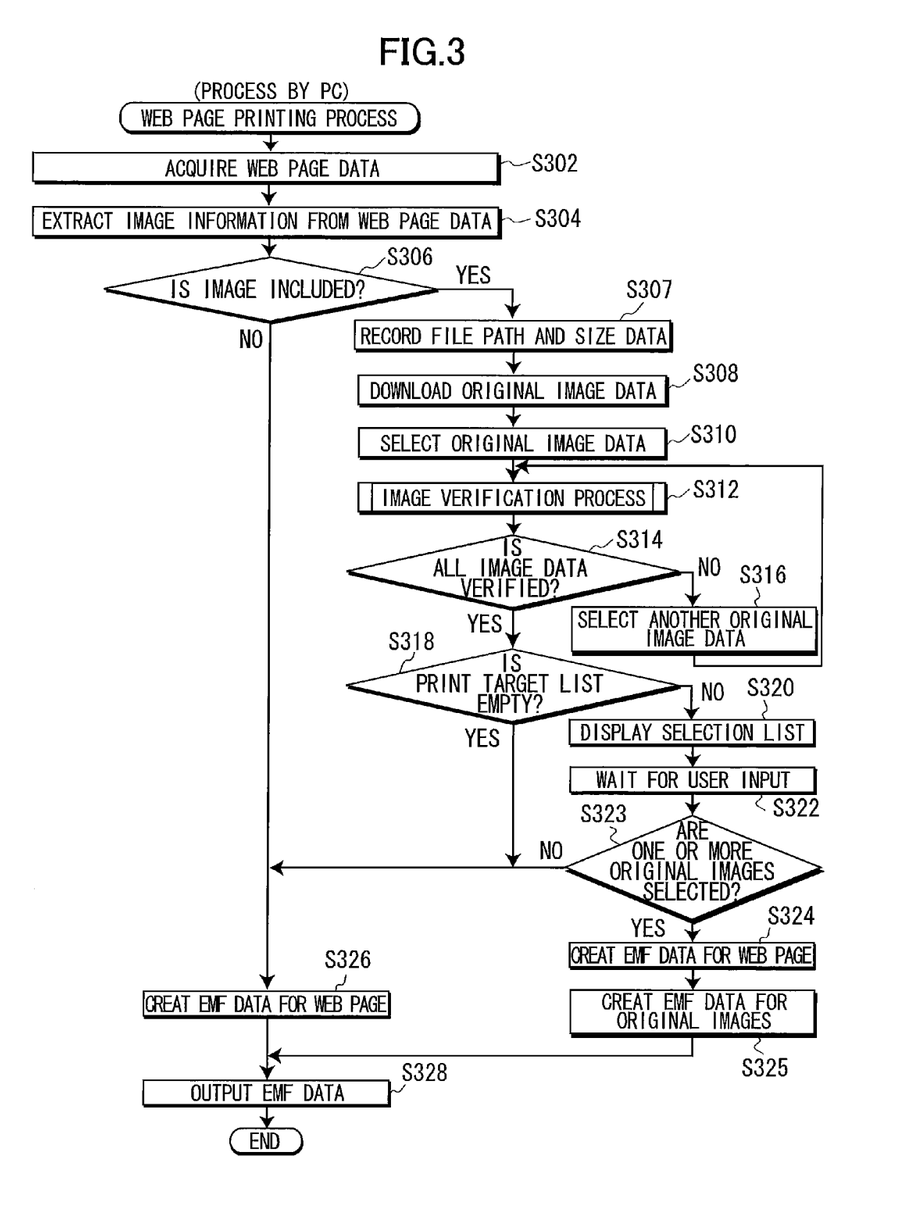
FIG. 3 is a flowchart illustrating steps in a Web page printing process executed by a CPU 11 of the personal computer.

FIG. 3 is a flowchart illustrating steps in a Web page printing process executed by the CPU 11 of the PC 10. The Web page printing process is executed to control the printer 20 to print the Web page $P_{30}$ and the original images 34 and is executed when the user inputs a print command on the input device 17 to print the Web page 30 while the Web page 30 is displayed in the Web browser 14a. The CPU 11 of the PC 10 executes this process according to the EMF creating program 14b. The following description also assumes that the user has already configured print settings before the process is initiated.

In Step S302 at the beginning of the process in FIG. 3 (hereinafter "Step" will be omitted), the CPU 11 acquires Web page data for the Web page 30 displayed on the LCD 18. The Web page data is the source code of the Web page 30 being processed. The Web page data includes the file paths for original image data and size data for the layout images 32, as described above, as well as various information regarding the images, such as the format of the original image data.

In S304 the CPU 11 extracts the information on the image from the Web page data and in S306 determines whether the Web page 30 includes images. The CPU 11 can determine whether the Web page data includes image data based on the format of the image files (JPEG or bmp, for example). If the CPU 11 determines that the Web page data does not contain any image data and thus that the Web page 30 does not include any images (S306: NO), in S326 the CPU 11 creates EMF data based on the Web page 30, and subsequently advances to S328 described later.

However, if the CPU 11 determines that the Web page data includes image data and hence that the Web page 30 includes at least one image (S306: YES), then in S307 the CPU 11 acquires a file path for each set of original image data and size data for each layout image 32 in the Web page 30 and records this data in the image list 13a. Here, file paths for original image data are recorded in the Web page data in association with size data for the layout images 32 laid out based on the original image data. Accordingly, in S307 the CPU 11 records the associated file paths and size data acquired from the Web page data in the image list 13a, while maintaining the associations.

In S308 the CPU 11 downloads original image data on which the layout images 32 are based from the Internet 8. The CPU 11 downloads original image data for all layout images 32 in the Web page 30. More specifically, the CPU 11 acquires the original image data from storage locations on the Internet 8 indicated by the file paths recorded in the image list 13a and stores this original image data in the image data memory 14d. Depending on the specifications of the Web browser 14a, the CPU 11 may instead display the layout images 32 on the Web page 30 rather than downloading the original image data. However, since the Web page printing process of the embodiment is provided with Step S308, the CPU 11 of the PC 10 can first reliably acquire original image data on which the layout images 32 are based before advancing to the subsequent processes.

In S310 the CPU 11 selects original image data for any single original image from among the data downloaded in S308. In S312 the CPU 11 executes an image verification process to verify whether the original image represented by the selected original image data is a print target and to record the original image in the print target list 13b when determining that the image is a print target. The image verification process will be described later in greater detail with reference to FIG. 4. Although not illustrated in the drawings, the CPU 11 sets a flag for the original image data that has been subjected to the image verification process in order to distinguish verified original image data from unverified original image data.

In S314 the CPU 11 determines whether the image verification process has been performed for all original image data. In other words, the CPU 11 determines whether flags indicating that original image data has been verified have been set for all sets of original image data. When the CPU 11 determines that there remains unverified original image data (S314: NO), in S316 the CPU 11 selects original image data for another original image from among the unverified original image data and repeats the image verification process in S312.

After repeatedly performing the image verification process until all original image data has been verified (S314: YES), in S318 the CPU 11 determines whether the print target list 13b is empty. If the print target list 13b is found to be empty (S318: YES), in S326 the CPU 11 creates EMF data based on the Web page 30, and subsequently advances to S328 described later.

However, if any original images have been recorded in the print target list 13b (S318: NO), in S320 the CPU 11 creates a selection list (not shown) of thumbnails or other data for specifying each of the original images recorded in the print target list 13b and displays this list, as distinction information, on the LCD 18 together with the Web page 30. Here, reduced image data needed to display the thumbnails may be obtained by reading such data stored in the header of the original image data or may be created from the original image data. The selection list displayed on the LCD 18 enables the user to distinguish between those original images that have been selected as print targets and those that have not been selected as print targets from among the original images on which all layout images 32 in the Web page 30 are based. Accordingly, the user can see which of the images can be printed in a more recognizable form. For example, the user can learn whether images can be printed at a larger size based on the original image data when the layout images 32 based on these original images were reduced in size to be displayed in the Web page 30. Next, the user can select desired original images from the original images that the CPU 11 of the PC 10 has set as print targets.

In S322 the CPU 11 waits for user input and receives the selections for original images to be printed. The PC 10 may clear the selection list from the LCD 18 after the user has finished selecting original images. Further, although the PC 10 is configured to display the selection list after verifying all original image data in the embodiment, the PC 10 may be configured to display the selection list together with the Web page 30 upon receiving a print command from the user to print the Web page 30 and to add a thumbnail or other data to the displayed selection list each time an original image is set as a print target in the image verification process of S312 in order to specify the original image newly set as a print target.

In S323 the CPU 11 determines whether one or more original images were selected in S322. If no original images were selected (S323: NO), in S326 the CPU 11 creates EMF data based on the Web page 30 and subsequently advances to S328 described later.

However, if at least one original image was selected (S323: YES), in S324 the CPU 11 creates EMF data based on the Web page 30 displayed by the Web browser 14a and in S325 creates EMF data for printing the selected original images at a size larger than the corresponding layout images 32 using the original image data stored in the image data memory 14d. If a plurality of original images was selected in S322, the CPU 11 creates EMF data for each original image. Here, EMF data is created so that the Web page $P_{30}$ and each of the original images 34 are printed on different sheets of paper P.

After creating EMF data for printing the Web page $P_{30}$ and the original images 34 in S324 and S325 or after creating EMF data for printing the Web page $P_{30}$ in S326, in S328 the CPU 11 outputs the EMF data, as print instruction, to the printer driver 14c, and subsequently ends the Web page printing process. Thereafter, the printer driver 14c creates print data from the EMF data and outputs this print data to the printer 20 to be printed.

Through the Web page printing process described above, the PC 10 can control the printer 20 to print original images 34 at a larger size than the corresponding layout images 32 in addition to printing the Web page $P_{30}$. Further, since the PC 10 controls the printer 20 to print the Web page $P_{30}$ and each of the original images 34 on different sheets of paper P, as illustrated in FIG. 2, the user has the added convenience of being able to use the Web page $P_{30}$ and the original images 34 separately.

Further, since the Web page printing process allows the user to select original images from those that have been specified for printing, the PC 10 can output EMF data to print those images that the user desires.

Figure 4:
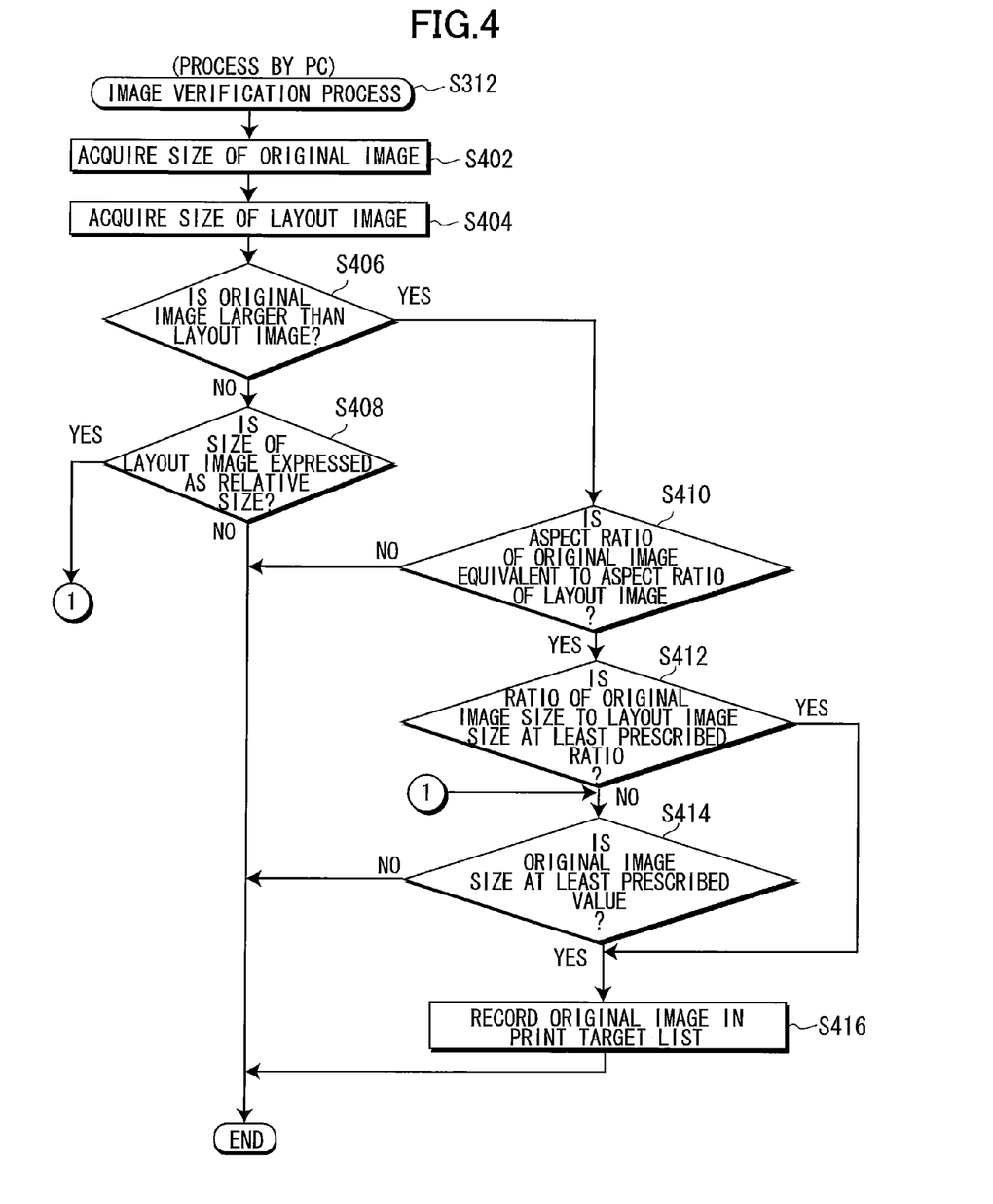
FIG. 4 is a flowchart illustrating steps in an image verification process executed by the CPU.

FIG. 4 is a flowchart illustrating steps in the image verification process of S312 executed by the CPU 11 of the PC 10. The image verification process serves to identify original images that are print targets.

In S402 at the beginning of the image verification process in FIG. 4, the CPU 11 acquires the size of the original image represented by the original image data stored in the image data memory 14d. Specifically, the CPU 11 reads the size (i.e., number of pixels in the width direction and number of pixels in the height direction) for the original image from properties recorded in the header of the selected original image data. In this way, accurate sizes of the original images can be acquired since the data is read from the properties of the original image data.

In S404 the CPU 11 acquires the size of the layout image 32 laid out in the Web page 30 based on the selected original image. That is, the CPU 11 acquires size data recorded in the image list 13a in association with the file path for the selected original image data and extracts (i.e., reads) the size of the layout images 32 specified in the size data. When the Web page data is in the HTML format and a "%" is attached to the size data, the size data specifies the ratio of the size of the layout image 32 to the size of the Web page 30. In other words, the size data denotes the relative size of the layout image 32. However, if a "%" is not attached to the size data, then the size data denotes the number of pixels in the layout image 32 (number of pixels in the width direction and number of pixels in the height direction), i.e., the absolute size of the layout image 32.

In S406 the CPU 11 determines whether the selected original image is larger than the layout image 32 arranged in the Web page 30 based on the selected original image. Specifically, the CPU 11 determines whether the number of pixels for the selected original image in the width direction and the height direction is greater than the number of pixels for the corresponding layout image 32 in the width direction and height direction. When the size of the layout image 32 is expressed as a relative size, the CPU 11 makes a negative determination in S406 and proceeds to S408. When the size data specifies the absolute size of the layout image 32, the CPU 11 reaches a negative determination in S406 if the layout image 32 has a size greater than or equal to the size of the original image.

If the selected original image is not larger than the corresponding layout image 32 (S406: NO), in S408 the CPU 11 determines whether the size of the layout image 32 is expressed as a relative size. If the size of the layout image 32 is not expressed as a relative size (S408: NO), the CPU 11 ends the image verification process. In this case, the CPU 11 does not set the original image expressed by the selected original image data as a print target.

However, when the original image is larger than the layout image 32 (S406: YES), the CPU 11 advances to S410 to check other conditions.

First, in S410 the CPU 11 determines whether the aspect ratio of the original image represented by the selected original image data is equivalent to the aspect ratio of the layout image 32 that is located in the web page 30 based on this original image data. If the aspect ratios are not equivalent (S410: NO), the CPU 11 ends the image verification process. In this case, the CPU 11 does not set the original image represented by the original image data as a print target. The CPU 11 does not select the original image when its aspect ratio differs from that of the layout image 32 because printing an image of higher clarity using the original image data for this original image is not likely to yield the desired printing results since the aspect ratio of the printed image will differ from the image that the user is viewing.

However, when the aspect ratio is equivalent to the aspect ratio of the layout image 32 (S410: YES), in S412 the CPU 11 determines whether the ratio of the size of the selected original image to the size of the layout image 32 that is located in the Web page 30 based on the selected original image is at least a prescribed ratio (1.5, for example). If the ratio of sizes is greater than or equal to the prescribed ratio (S412: YES), in S416 the CPU 11 records the original image in the print target list 13b and subsequently ends the image verification process.

However, if the ratio of the size of the selected original image to the size of the layout image 32 is less than the prescribed ratio (S412: NO) or if the CPU 11 determines in S408 that the size of the layout image 32 is represented as a relative size (S408: YES), in S414 the CPU 11 determines whether the size of the original image represented by the selected original image data is at least a prescribed value (200×150, for example). If the size of the original image is greater than or equal to the prescribed value (S414: YES), in S416 the CPU 11 records the original image in the print target list 13b and subsequently ends the image verification process. However, if the CPU 11 determines in S414 that the size of the original image is less than the prescribed value (S414: NO), the CPU 11 ends the image verification process. In the latter case, the CPU 11 does not select the original image represented by the selected original image data as a print target.

Through the image verification process of S312, the PC 10 can set original images as print targets when the creation of EMF data based on the original image data for the original image is likely to benefit the user. That is, EMF data created based on original image data for an original image will have a great effect on improving the legibility of the printed result when the size of the original image relative to the size of the layout image 32 exceeds a prescribed ratio. Consequently, the PC 10 sets these types of original images as print targets in the image verification process of the embodiment.

The PC 10 also determines that an original image should be printed when the image is larger than the corresponding layout image 32 and when the size of the original image exceeds a prescribed value. Since the user will not likely need images, such as buttons and banners in the Web page 30, to be printed on separate sheets of paper P, this process can limit the number of such images that are set as print targets.

Further, when the size data denotes the relative size of the layout image 32, the PC 10 sets an original image as a print target only when the size of the original image exceeds a prescribed value, regardless of whether the original image is larger than the layout image 32. Therefore, the PC 10 can determine whether an original image should be printed, even when the size of the layout image 32 is expressed as a relative size.

While the invention has been described in detail with reference to the embodiments thereof, it would be apparent to those skilled in the art that various changes and modifications may be made therein without departing from the scope of the invention.

The data processor of the invention may be implemented by other devices, such as the printer 20 or a mobile phone.

While the Web page $P_{30}$ and the original images 34 are printed on separate sheets of paper P in the embodiment, the data processor may be configured to print the Web page $P_{30}$ and the original images 34 on a single sheet of paper P when it is possible to arrange all images on the sheet. In this case, the data processor creates EMF data for printing the targeted original images and the Web page $P_{30}$ on different pages and controls the printer 20 to print a plurality of pages worth of images (i.e., the original images and the Web page $P_{30}$) together on a single sheet of paper P.

Further, while Web page data is used in the embodiment as an example of target data processed by the data processor of the invention, various other data may serve as the target data, including document files and spreadsheet files. Document files and spreadsheet files may be targeted for processing by the data processor because images are laid out in display data displayed based on such files when either images are embedded in the files or the files contain links specifying images to be laid out therein.

In the embodiment described above, the EMF creating program 14b executes the Web page printing process and outputs EMF data created in this process to the printer driver 14c. However, when the printer 20 is capable of processing EMF data, the EMF creating program 14b may be configured to output the EMF data directly to the printer 20.

Further, while EMF data is used as print instruction, in the embodiment, the invention may be applied, to cases in which PostScript data or data in other formats is created as a print command. The invention is also applicable to a configuration in which the CPU 21 of the printer 20 acquires Web page data and original image data from the Internet 8 and/or the PC 10, generates EMF data, as an example of the print instruction, based on this data, and outputs the print command to the printing unit 27.

In the embodiment described above, a selection list is displayed together with the Web page 30 as "differentiation information" for showing a distinction between original images set as print targets and original images that are not set as print targets. As an alternative, the differentiation information may be configured of marks displayed next to those layout images 32 in the Web page 30 based on original images that have been set as print targets, for example. There is no particular restriction on the format of this differentiation information. Further, while thumbnails are displayed in the selection list in the embodiment described above, the filenames of the original image data or other data that can convey to the user which original images have been set as print targets may be displayed in the selection list.

In the embodiment described above, the data processor determines that the original image is larger than the layout image when the numbers of pixels in the original image in the width and height directions are greater than the numbers of pixels in the layout image in the width and height directions. However, the data processor may instead determine that the original image is larger than the layout image when the number of pixels in the original image is greater than the number of pixels in the layout image in at least one of the width direction and the height direction.

An additional step may be provided in the Web page printing process of the embodiment (FIG. 3) prior to S325 for comparing the size of an original image with the size of the paper loaded in the printer 20. If the PC 10 determines that the original image does not fit within the size of the paper, the PC 10 may be configured to perform a reduction process on the original image data so that the original image will fit within the paper, and subsequently may create EMF data, as an example of print instruction, using the reduced original image data. The PC 10 may also be configured to change the orientation of the original image relative to the paper so that the image can fit within the specified paper size.

In the Web page printing process of the embodiment, the PC 10 controls the printer 20 to print the Web page $P_{30}$ and the original images 34 upon receiving a print command for printing the Web page 30. Alternatively, or in addition, the PC 10 may be configured to execute a Web page printing process for creating a print instruction using the original image data on which a layout image 32 of the Web page 30 is based upon receiving EMF data, as an example of print instruction, for this layout image 32, and may control the printer 20 to print an original image 34 that is larger than the layout image 32.

In S412 of the image verification process according to the embodiment (FIG. 4), the PC 10 determines whether the size of the original image relative to the size of the layout image 32 exceeds a prescribed ratio. When this "prescribed ratio" is set to a value greater than "1", the process in S412 may be used to determine whether the size of the original image is greater than the size of the layout image. In this case, the process of S406 for determining whether the size of the original image is greater than the size of the layout image 32 may be eliminated, and the process may advance to S410 upon reaching a negative determination in S408 (S408: NO).

The image verification process described in FIG. 4 according to the embodiment may be modified to set an original image as a print target under the condition that the ratio of the size of the original image to the size of the layout image based on this original image is greater than or equal to a prescribed ratio (0.9, for example), or that the size of the original image is greater than or equal to a prescribed value, regardless of whether the original image is larger than the layout image, by eliminating the determinations in S406, S408, and S410 and advancing directly to the determination in S412 after completing S404. This variation is also convenient for the user since images in the display data that meet the prescribed condition can be printed on separate sheets.

While the condition for selecting original images to be printed in the image verification process of the embodiment is that the aspect ratio of the original image is identical to that of the layout image, the invention may be implemented without this condition.

What is claimed is:

1. A non-transitory computer readable storage medium storing a set of program instructions installed on and executed by a computer, the set of program instructions comprising:
    (a) acquiring a layout image size that is a size of a layout image, the layout image being generated based on an original image data, the size of the layout image being specified by base data, the base data representing graphical image in which the layout image is arranged and including location data that specifies a location at which the original image data is stored;
    (b) acquiring an original image size that is a size of an original image represented by the original image data;
    (c) determining whether the original image size is greater than the layout image size;
    (d) setting the graphical image in which the layout image is arranged as a print target, and setting the original image as another print target when the original image size is greater than the layout image size;
    (e) generating a print instruction instructing to print the graphical image as the print target and the original image set as the another print target such that the printed original image is greater than the printed layout image arranged in the printed graphical image; and
    (f) outputting the print instruction,
    wherein the generating instruction (e) generates the print instruction to print the graphical image and the original image such that both the graphical image and the original image are printed on a single sheet, and such that the printed original image is greater in size than the printed layout image arranged in the printed graphical image.

2. The non-transitory computer readable storage medium according to claim 1, wherein the generating instructions (e) generate the print instruction instructs to print the original image and the graphical image on different recording sheets.

3. The non-transitory computer readable storage medium according to claim 1, wherein the set of program instructions further comprises (g) acquiring the original image data from the location specified by the location data,
    wherein the acquiring instructions (b) acquire the original image size from the original image data.

4. The non-transitory computer readable storage medium according to claim 1, wherein the set of program instructions further comprises (h) determining whether an aspect ratio of the original image is equal to an aspect ratio of the layout image,
    wherein the setting instructions (d) set the original image as the print target when the original image size is greater than the layout image size and when the aspect ratio of the original image is equal to the aspect ratio of the layout image.

5. The non-transitory computer readable storage medium according to claim 1, wherein the set of program instructions further comprises (i) determining whether an image size ratio of the original image size to the layout image size is equal to or greater than a prescribed ratio,
    wherein the setting instruction (d) sets the original image as the print target when the image size ratio is equal to or greater than the prescribed ratio.

6. The non-transitory computer readable storage medium according to claim 1, wherein the set of program instructions further comprises (j) determining whether the original image size is equal to or greater than a prescribed size,
    wherein the setting instructions (d) set the original image as the print target when the original image size is greater than the layout image size and when the original image size is equal to or greater than the prescribed size.

7. The non-transitory computer readable storage medium according to claim 6, wherein the layout image size is represented by number of pixels of the layout image.

8. The non-transitory computer readable storage medium according to claim 6, wherein the layout image size is represented by one of number of pixels of the layout image and a size ratio of the layout image size to a size of graphical image,
    wherein the setting instructions (d) set the original image as the print target when the layout image size is represented by the size ratio and when the original image size is equal to or greater than the prescribed size, regardless of whether the original image size is greater than the layout image size.

9. The non-transitory computer readable storage medium according to claim 1, wherein the set of program instructions further comprises (k) displaying the graphical image and differentiation information that prompts to distinguish the original image set as the print target and the original image that is not set as the print target.

10. The non-transitory computer readable storage medium according to claim 1, wherein the set of program instructions further comprises (1) receiving a selection of the original image that is selected by a user from among the original image set as a print target,
    wherein the generating instructions (e) generate the print instruction instructing to print the original image that is selected by the user by obtaining the original image data from the location specified by the base data.

11. The non-transitory computer readable storage medium according to claim 1, wherein the generating instructions (e) generate the print instruction instructs to print the original image and the graphical image on one recording sheet.

12. The non-transitory computer readable storage medium according to claim 1,
    wherein the base data is web page data in HTML format.

13. A data processor comprising:
    a processing unit; and
    a non-transitory medium having instructions stored thereon that, when executed by the processing unit, cause the processing unit to function as:

a layout image size acquiring part configured to acquire a layout image size that is a size of a layout image, the layout image being generated based on an original image data, the size of the layout image being specified by base data, the base data representing graphical image in which the layout image is arranged and including location data that specifies a location at which the original image data is stored;

an original image size acquiring part configured to acquire an original image size that is a size of an original image represented by the original image data;

a determining part configured to determine whether the original image size is greater than the layout image size;

a setting part configured to set the graphical image in which the layout image is arranged as a print target and to set the original image as another print target when the original image size is greater than the layout image size;

a generating part configured to generate a print instruction instructing to print the graphical image as the print target, and the original image set as the another print target such that the printed original image is greater than the printed layout image arranged in the printed graphical; and an outputting part that outputs the print instruction, wherein the generated print instruction is to print the graphical image and the original image such that both the graphical image and the original image are printed on a single sheet, and such that the printed original image is greater in size than the printed layout image arranged in the printed graphical image.

14. The data processor according to claim 13, wherein the base data is web page data in HTML format.

15. A method comprising:

(a) acquiring a layout image size that is a size of a layout image, the layout image being generated based on an original image data, the size of the layout image being specified by base data, the base data representing graphical image in which the layout image is arranged and including location data that specifies a location at which the original image data is stored;

(b) acquiring an original image size that is a size of an original image represented by the original image data;

(c) determining whether the original image size is greater than the layout image size;

(d) setting the graphical image in which the layout image is arranged as a print target, and setting the original image as another print target when the original image size is greater than the layout image size;

(e) generating a print instruction instructing to print the graphical image as the print target, and the original image set as the another print target such that the printed original image is greater than the layout image arranged in the printed graphical image; and (f) outputting the print instruction, wherein the generating print instruction (e) generates the print instruction to print the graphical image and the original image such that both the graphical image and the original image are printed on a single sheet, and such that the printed original image is greater in size than the printed layout arranged in the printed graphical image.

16. The method according to claim 15, wherein the base data is web page data in HTML format.

\* \* \* \* \*